United States Patent [19]

Freeman

[11] Patent Number: 4,965,487
[45] Date of Patent: Oct. 23, 1990

[54] FLAT CATHODE RAY TUBE DISPLAY APPARATUS

[75] Inventor: Kenneth G. Freeman, Reigate, England

[73] Assignee: U.S. Philips Corporation, New York, N.Y.

[21] Appl. No.: 322,746

[22] Filed: Mar. 13, 1989

[30] Foreign Application Priority Data

Mar. 23, 1988 [GB] United Kingdom ............. 8806918

[51] Int. Cl.⁵ .................... H01J 29/70; G09G 1/04
[52] U.S. Cl. ............................... 313/422; 313/421; 315/366
[58] Field of Search ............... 313/422, 421; 315/366

[56] References Cited

U.S. PATENT DOCUMENTS

| | | | |
|---|---|---|---|
| 4,667,134 | 5/1987 | Terry | 315/366 |
| 4,698,555 | 10/1987 | Knapp et al. | 313/422 |
| 4,737,690 | 4/1988 | Lamport et al. | 313/422 |
| 4,873,472 | 10/1989 | Freeman | 313/422 |

FOREIGN PATENT DOCUMENTS

| | | |
|---|---|---|
| 1434053 | 4/1976 | United Kingdom . |
| 2023332 | 12/1979 | United Kingdom . |
| 2101396 | 1/1983 | United Kingdom . |
| 2124017 | 2/1984 | United Kingdom . |
| 2181319 | 4/1987 | United Kingdom . |

Primary Examiner—Donald J. Yusko
Assistant Examiner—Michael Horabik
Attorney, Agent, or Firm—Robert J. Kraus

[57] ABSTRACT

In a flat cathode ray tube display apparatus a low energy, electron beam (18) is directed substantially parallel to a faceplate (12) carrying a phosphor screen (14) in a space between a deflection electrode array (22) and the input side of an electron multiplier (16) adjacent the screen where it is deflected by operation of the electrode array (22) in field scann manner towards the screen to provide a raster scanning input to the multiplier. the deflector electrodes (23) of the array are switched successively between two voltage levels in each field to step the line scanning beam with the switching voltages in successive fields differing whereby two interleaved sets of display lines are drawn in two consecutive fields which together constitute a display frame having the required number of active display lines. The voltage switching circuit (52) may be carried on a substrate adjacent the electrode array. For color display the screen comprises a pattern of different color phosphor elements and a selection electrode arrangement (38) is disposed adjacent the multiplier output side. Three differently colored, and accurately superimposed, sub-lines are drawn on the screen in a standard line scan period between stepping the beam.

14 Claims, 4 Drawing Sheets

FLAT CATHODE RAY TUBE DISPLAY APPARATUS

BACKGROUND OF THE INVENTION

This invention relates to a flat cathode ray tube display apparatus comprising a cathode ray tube having an envelope, a luminescent screen extending over a substantially flat faceplate, means in the envelope for producing and directing an electron beam substantially parallel to the faceplate, and a deflection electrode array within the envelope and operable by a drive circuit for deflecting the line scanning beam in a direction towards said faceplate in field scanning manner.

An example of such a flat cathode ray tube display apparatus is described in British patent specification No. 2,101,396B. In this example a line scanning beam is produced by an electron gun and electrostatic deflector arrangement and directed substantially parallel to the faceplate in a rear region of the tube before being turned through 180 degrees by a reversing lens at one end of the tube and introduced into a region between the deflection electrode array and the screen with the plane of the line scanning beam being substantially parallel to the faceplate. The electron beam is a low-energy beam, and in the particular example described is a low current, low voltage beam of around 400 volts acceleration. A channel electron multiplier is situated parallel to, and spaced from, the screen and the electron beam is deflected by the deflection electrode array over an input side of the electron multiplier to provide a raster scanned input thereto. Having undergone current multiplication within the electron multiplier, the beam is accelerated onto the screen by means of a high voltage field established between the output side of the multiplier and a backing electrode on the screen to produce a raster-scanned display picture. Such a display apparatus may be used for television or other video display purposes.

In the known apparatus, the beam is deflected progressively downwards over the input side of the multiplier in field scan fashion by selective energisation of a plurality of vertically-spaced horizontally elongate electrodes which form a deflection electrode array situated parallel to the faceplate on the opposite side of the electron beam path and which in conjunction with an electrode at a fixed potential over the input side of the multiplier, create deflection fields for the beam.

The electrode array is driven to achieve continuous vertical scan by applying ramp voltages to adjacent pairs of electrodes in turn successively, the timing of the ramp voltages to the electrodes of each pair being predetermined. This form of driving allows a small number of electrodes to be used in the array, typically around fifteen. However, because of the way in which the electrodes are driven, the drive circuit necessary is complicated. The drive circuit is provided externally of the tube's envelope and is interconnected with the electrodes of the deflection array via respective lines thereby requiring a large number of lead-throughs to be provided in the envelope. By driving two electrodes of the array at a time with suitably timed linear ramps approximately uniform spot-height and vertical linearity are obtained. However, the residual, spatially-periodic, variations in line-pitch can be noticeable, because they produce a corresponding variation in apparent brightness, and careful control of the ramp shape and start and stop times is necessary. Acceptable results with monochrome displays can be obtained.

British patent specification No. 2,181,319A describes a version of this known type of display apparatus for displaying full colour pictures. The described apparatus has a luminescent screen which consists of a repeating pattern of three phosphor elements adapted to luminesce in different colours respectively, and further includes colour selection electrodes disposed intermediate the output side of the electron multiplier and the screen which are operable to deflect the electron beam exiting from the channels of the multiplier and by appropriate control of which the beam can be directed selectively onto each of the plurality of phosphor elements.

Briefly the colour selection electrodes used in this apparatus are in the form of a pair of electrodes for each channel of the electron multiplier arranged on opposite sides of the channel axis by means of which the electron beam exiting from the channel can be deflected to one side or the other so as to impinge upon respective ones of the phosphor elements to display selectively first and second colours, e.g. red and blue. In the undeflected state, that is with no potentials or the same potentials applied to the pairs of electrodes, the electron beam is directed onto the third phosphor element of the repeating pattern to produce a green display.

This display apparatus enables, therefore, a colour picture to be produced using a single electron beam which is scanned in raster fashion over the input side of the electron multiplier, the required line and field scan deflectors operating on the beam prior to reaching the electron multiplier.

The display apparatus may be used in order to display television pictures according to a conventional standard scanning format, for example the PAL standard of 625 lines, 50 Hz field format where the input red, green and blue signals are derived from an RGB source such as a camera, telecine or from a PAL decoder.

There is described in the aforementioned British patent specification No. 2,181,319A, a driving technique for producing colour television pictures from such a tube in which line scanning and colour selection are performed sequentially at three times the normal rate, i.e. at 46.875 kHz for the PAL system, the red, green and blue components of each television line being stored, time-compressed and displayed in sequence during one standard line period of 64 microseconds. Thus each normal television line is presented as three individual, and respectively coloured, lines each of which is drawn in one third of the standard line period. This driving technique will hereafter be referred to as triple line sequential operation.

In one possible mode of operation, vertical field scanning is effected in a continuous manner. For this, approximately linear ramps are successively applied to successive adjacent pairs of the electrodes of the array in predetermined relationship giving a conventional raster. The number of the individual electrodes in the array, typically fifteen, is a compromise dictated by the need to achieve vertically-uniform spot-height and picture geometry and brightness, whilst keeping the number of tube lead-throughs and external circuitry needed to drive the electrodes to a minimum. This requires the ramps to be non-linear in a particular manner and their start and end times to be accurately defined. Depending on the selection sequence adopted, that is, the order in which the individual colour lines are drawn, it can be expected that with such continuous vertical scan visible colour line structure, crawl or flicker impairments to the display will occur.

In an alternative mode of operation, vertical scan is effected in a stepped manner with the three individual colour lines ideally being superimposed on one another and thereafter the scanning beam is deflected one step to the next television line position and the process repeated. This mode of operation obviates the aforementioned display impairments as the red, green and blue component of each television display line are overlaid and the eye cannot detect the residual temporal errors. This technique also makes it possible to ensure a uniform line pitch and raster brightness. Stepped deflection can be achieved by replacing the linear ramps by non-linear staircase waveforms derived from values stored in digital memories, each step taking place during line blanking. In order to ensure an acceptably uniform field scan by this method it is considered that the memories would need to have around 12-bit resolution and the subsequent analogue circuits would need to have a very high stability. Such components would likely add significantly to the cost of the display system.

SUMMARY OF THE INVENTION

It is an object of the present invention to provide an improved form of the flat cathode ray tube apparatus mentioned in the opening paragraph.

It is another object of the present invention to provide a flat cathode ray tube of the kind mentioned in the opening paragraph in which field scanning is accomplished in stepped manner without the need for expensive digital memory components.

According to the present invention, a flat cathode ray tube display apparatus as mentioned in the opening paragraph is characterised in that the deflection electrode array comprises a plurality of deflector electrodes which are switched successively between two selected voltage levels in each field period to produce deflection fields with at least one of the selected voltage levels being different in alternate fields whereby in one field period one set of display lines is produced on the screen and in the successive field period a second set of display lines interlaced with the first set is produced.

In cooperation with an electrode parallel to and spaced from the deflection electrode array towards the screen the voltages applied to the deflector electrodes of the array are controlled to create a beam deflection field. Preferably, the electron beam is a low-energy electron beam, that is, up to around 2.5 Kev and typically around 400 eV, and the tube further includes (as in the aforementioned earlier arrangements) a channel electron multiplier disposed parallel to, and spaced from, the screen over whose input side the electron beam is scanned by the deflection electrode array. In this case the cooperating electrode may be constituted by the input side of the multiplier. Switching of the voltages applied to the deflector electrodes with respect to the cooperating electrode in succession at regular intervals from a first level at the voltage of the cooperating electrode and a second level negative with respect to that voltage a deflection field acting on the beam is in effect moved progressively in regular steps vertically corresponding to the deflector electrode spacing so that the region at which the beam is caused to be deflected from its plane substantially parallel to the screen towards the screen, and hence the position where the beam impinges on the screen, is stepped vertically to achieve field scanning of the beam over the input side of the multiplier.

The electron beam may comprise a line-scanning beam, for example produced by a single electron gun in conjunction with a deflector arrangement, which is scanned over the luminescent screen in raster fashion through the action of the deflection electrode array. Alternatively, the apparatus may comprise means for generating a plurality of substantially parallel beams which, when deflected towards the luminescent screen by the deflection electrode array, together write a display line.

In arranging that at least one of the voltage levels between which the deflector electrodes are switched is different for alternate fields in accordance with the invention then the deflection field produced by the same deflector electrode in two successive field periods is different so that the positions where the, for example, line-scanning, beam impinges on the screen as a result of the action of that electrode in two successive fields are displaced vertically from one another. Considering the action of the array of deflector electrodes in two consecutive fields periods, then the two offset and interlaced sets of display lines produced combine to form one picture frame with the required total number of display lines. It will be appreciated therefore that a frame consisting of n display lines can be displayed using only n/2 deflector electrodes in the array with the array producing a set of up to n/2 display lines each field. This process is repeated after every two fields with the same switching voltages so that the display lines of alternate fields coincide spatially on the screen.

In order, for example, to display a picture according to the PAL standard format involving 575 lines, the apparatus can be arranged to display a set of 288 lines in one field followed by 287 interlaced lines in the next field by using 288 deflector electrodes in the array.

The deflector electrodes are preferably spaced so as to form substantially equally spaced display lines on the screen and the switching voltages chosen such that the display lines of one of the two sets of interlaced lines obtained are, apart from the first or the last, positioned substantially midway between adjacent pairs of lines of the other set.

Thus the invention offers the advantage, for both monochrome and colour display forms of the apparatus, that vertical scanning is effected in stepped manner by simple switching of voltages applied to the deflector electrodes, thereby avoiding the need for non-linear staircase waveforms for example as in known apparatus. Consequently, a comparatively simple drive circuit can be used to operate the deflection electrode array. This circuitry may readily be incorporated within the tube's envelope thereby avoiding the need to provide a large number of leadthroughs in the envelope to connect the electrodes with external circuitry as in the earlier forms of display apparatus. The timing and switching elements of the circuitry may, for example, be fabricated using LSI technology on a substrate carrying the deflector electrode array alongside and connected to the electrodes so that the only connections then necessary from outside the tube are d.c. voltage and timing lines.

The stepped vertical scan system offers the further important advantage in the case of the apparatus being a colour display apparatus of rendering the apparatus highly suited for use with the aforementioned triple line sequential drive scheme, the screen comprising in this case a repeating pattern of three phosphor elements adapted to luminesce in different colours respectively and the tube further including a colour selection electrode arrangement disposed between the output side of the multiplier and the screen. The deflection electrode array and its manner of driving removes the need to apply high precision staircase waveforms to the electrodes for stepped vertical scanning. Stepped vertical scan by switching the electrode voltage ensures accurate superimposition of the three differently-coloured lines constituting a TV line in a simple and convenient way which avoids using digital memories and stable drivers.

Preferably, the electrodes of the array are switched by the drive circuit in succession during alternate field periods from a first predetermined voltage to a second predetermined voltage and during intervening field periods between the first predetermined voltage and a third predetermined voltage different to the second predetermined voltage at standard line scan intervals, namely 64 microsecond intervals for TV display, within conventional line blanking intervals. In a preferred arrangement, the drive circuit comprises a transistor switching bridge circuit for each deflector electrode, the bridge circuits being connected to a common first voltage source at the first predetermined voltage, and a common second voltage source switched alternately between the second and third predetermined voltages during consecutive field blanking periods, and a control circuit for operating the bridge circuits one after the other according to normal line scan intervals.

A similar deflection effect could, however, be produced using a different voltage for the input electrode of the multiplier in alternate fields in addition to, or instead of, using different selected switching voltage levels. However, this is less desirable as it is thought preferable to maintain the voltages applied to the multiplier constant over successive fields to obtain uniform performance.

In a preferred embodiment, the deflector electrodes are operated such that, at the beginning of each field, all the electrodes are at the first predetermined voltage and are individually switched in turn to the second or third predetermined voltage as appropriate to that field so as to move the point at which the line scanning beam is deflected towards the input face progressively vertically over the input face. In this operation it is necessary to switch each electrode only once during a field display with the electrodes being returned to the first predetermined voltage in the field blanking period prior to the beginning of the next display field.

BRIEF DESCRIPTION OF THE DRAWING

A cathode ray tube display apparatus in accordance with the invention and for displaying colour pictures will now be described, by way of example, with reference to the accompanying drawings, in which.

DESCRIPTION OF THE PREFERRED EMBODIMENTS

Figure 1:
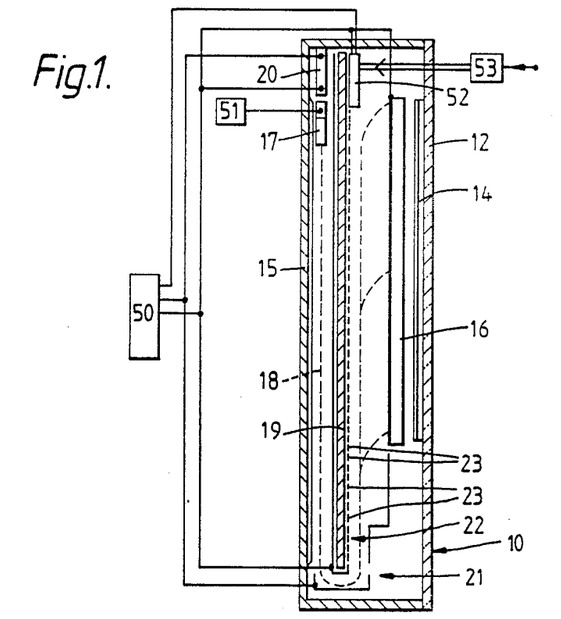
FIG. 1 is a diagrammatic elevation through a flat display tube of the apparatus and shows schematically associated drive circuitry.

Referring to FIG. 1, there is shown a flat cathode ray tube which comprises a rectangular envelope 15 having a substantially flat glass faceplate 12. On the inside of the faceplate 12 there is provided a phosphor screen 14 comprising repeating groups of red, R, green, G, and blue, B, vertically extending phosphor lines. A channel plate electron multiplier 16 having apertured input and output surface electrodes is arranged parallel to, and spaced from, the faceplate 12. An electron gun 20 is disposed in the rear portion of the envelope and directs a low-energy electron beam 18 downwardly in a direction parallel to the faceplate 12 between the rear wall of the envelope 15 and a partition 19, the rear wall and partition carrying electrodes defining a field free space therebetween. The beam is deflected in a plane parallel to the faceplate 12 to effect line scanning by means of an electrostatic deflector 17 positioned near the gun 20. The line scanning beam 18 is deflected through 180 degrees by a reversing lens 21 at the lower end of the envelope so that it travels in the opposite direction over the other side of the partition 19.

The partition 19, which is of glass or other insulative material, carries a plurality of selectively energisable, vertically spaced, horizontally elongate strip-like electrodes 23 forming a deflection electrode array 22. Because of the geometry of the folded electron beam path and in order to counter the effect that the line of the line scanned beam is slightly bowed rather than straight after reflection by the reversing lens 21, the electrodes 23 are slightly bowed in the opposite direction. The electrodes 23 are operable to effect vertical field scanning of the line scanning electron beam 18 over the input face of the channel plate electron multiplier 16, as will be described in greater detail. Having undergone electron multiplication within the multiplier 16, the beam is accelerated on to the phosphor screen 14 by means of an aluminium backing electrode of the screen. Thus, the line scan deflector 17 and field scan electrode array 22 serve to scan the single electron beam 18 in raster fashion over the input face of the channel plate electron multiplier 16 to produce a raster scanned picture on the screen 14.

The display tube of FIG. 1, apart from the electrode array 22 and its associated drive as will be described, is similar in many respects to the tube described in British patent specification No. 2101396B and reference is invited to this specification for a more detailed description of the tube and its construction. An important difference however is that the tube of the aforementioned specification is monochrome, having a single colour phosphor screen, whereas the tube of FIG. 1 is intended for colour display and accordingly is provided with additional features for this purpose.

The channel plate electron multiplier 16 may be a laminated dynode kind of multiplier. Examples of the construction of this kind of multiplier are given in British patent specifications Nos. 1,434,053 and 2,023,332A.

Figure 2:
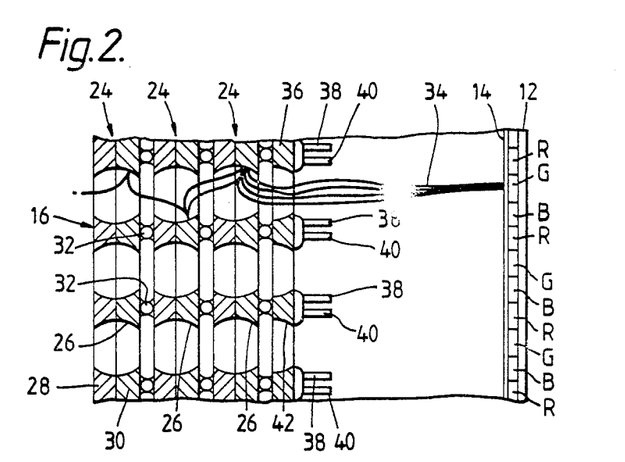
FIG. 2 is a transverse sectional plan view, not to scale, depicting the screen and the faceplate of the tube and the final three stages of a laminated channel plate electron multiplier, and a colour selection electrode arrangement used in the tube.

Briefly, the electron multiplier 16 comprises a plurality of apertured dynodes 24 of which the last three are shown in FIG. 2. The barrel-shaped apertures 26 in successive dynodes are aligned with each other to form channels. The dynodes 24 in fact comprise two half dynodes 28, 30 arranged back to back. Successive dynodes 24 are separated from each other by a resistive or insulating spacing means 32. The side of the multiplier 16 at the first dynode is covered by an apertured input electrode facing the electrode array 22. In operation the electron beam 18 entering a channel undergoes current multiplication by secondary emission as it passes from one dynode to the next, each of which is typically 300V more positive than the previous one. In order to extract the current multiplied electron beam, 34, from the final dynode of the electron multiplier 16, an extractor electrode 36 is provided. This extractor electrode 36 generally comprises a half dynode mounted on, but spaced from, the final dynode. A positive voltage, typically +200V relative to that of the last dynode, is applied to the extractor electrode 36 which not only draws out the electron beam 34 but also focuses it.

With the illustrated arrangement of the phosphors R, G and B in the repeating groups, an undeflected, current multiplied electron beam 34 will impinge on the green phosphor G. To impinge on the red, R, and blue, B, phosphors the electron beam 34 is deflected to the left and to the right, respectively, (i.e. up and down respectively in FIG. 2). This is achieved by colour selection electrodes comprising pairs of strip electrodes 38, 40 (not shown in FIG. 1 for simplicity) arranged one on each side of each aperture 42 in the extractor electrode 36. The channels of the multiplier, and likewise the aligned apertures 42 of the extractor electrode 36, are arranged rectilinearly in horizontally spaced columns and the electrodes 38, 40 are elongate, extending the height of the columns. All the electrodes 38 are interconnected as are the electrodes 40. The electrodes 38, 40 are electrically insulated from the extractor electrode 36. The deflector electrodes 38, 40 act as part of the lens system which forms an electron beam 34 of the required size. The colour selection electrode arrangement is described in greater detail in British patent specification No. 2124017A.

In operation, in order to deflect the electron beam 34 it is necessary to apply a potential difference between the sets of electrodes 38, 40. For example, in a situation where relative to the final dynode the extractor electrode 36 is at, say, +200V and the screen 14 is at, say, +7 to 12 kV, then for an undeflected beam 34 a mean voltage of +125V is applied to the electrodes 38, 40 and in this case to obtain a deflection in one direction or the other a potential difference of, say, 60V is produced so that for a deflection onto the red phosphor, R, the electrode 40 is at +155V whilst the electrode 38 is at +95V, the voltages being the opposite way around for deflection onto the blue phosphor B.

The mode of operation of the apparatus to display pictures in accordance with received video signals conforming to a standard format will now be described. The following description concerns the display of video signals according to the standard PAL scanning format by way of example, that is 625 lines, 2:1 interlace, 50 Hz field format where input red, green and blue signals are derived from sources such as a PAL decoder, or a camera or telecine. It will be appreciated that the apparatus may be used with other standard formats instead.

Line scan is performed by the deflector 17 at three times the standard rate, that is, three times the rate determined by the standard PAL scanning format, and the red, green and blue components of each standard PAL line are displayed in turn, separately, in the form of three respectively coloured sub-lines during the normal standard line period, which is 64 s. In order to do this, the necessary sequential, time-compressed, colour components are derived using a number of television line-stores which store a respective one of the three colour components for each PAL line and which are read-out at three times the write-in rate. The colour deflection voltages applied to the colour selection electrodes, 38 and 40, are cyclically changed line-sequentially between the three values necessary to deflect the electron beam 34 emerging from the channel plate electron multiplier 16 onto the respective red, green and blue phosphor lines of the screen 14. Either reversing (RGBBGRRGBBG . . . ) or continuous (RGBRGB . . . ) colour sequences may be used. As successive lines are scanned in the different colour selection modes, the appropriate red, green and blue primary signals are sequentially supplied to the electron gun 20 in synchronism. For further information regarding this triple line sequential operation, reference is invited to British patent specification No. 2181319A.

Vertical field scanning of the electron beam is accomplished by stepping the vertical scan after every three triple-PAL rate scanning lines, that is, after each block of three separately drawn and differently coloured sub-lines corresponding to a single PAL standard line, so that the red, green and blue components of each standard PAL line are accurately superimposed and the maximum spatial error is, in principle, zero. To achieve this, the electrodes 23 of the deflection electrode array 22 are selectively switched between predetermined potential levels, whereby after every group of three sub-lines drawn corresponding to a single PAL line, i.e. every 64 s, the beam is stepped downwardly over the input face of the multiplier by an amount corresponding to the spacing of the next required line in that field.

To this end, and in accordance with the invention, a display frame comprising the required number of conventional active raster lines is produced by an interlaced scan over two consecutive fields with two, interleaved, sets of display lines being defined, one set in each of the two fields, by the same deflector electrodes 23 of the array 22. The number of individual electrodes 23 in the deflection electrode array 22 corresponds to the maximum number of raster lines to be produced in either of the fields. Each of the electrodes 23 is individually switchable in each field between two predetermined voltage levels to create in conjunction with the input side electrode of the multiplier a deflection field which causes deflection of the line scanning beam towards the input face of the multiplier 16 in the region of the electrode switched. The size and spacing of the channels in the multiplier 16 are such that each raster display line has associated with it at least one row of channels.

To achieve this interlaced scan using the same deflector electrodes of the array, one of the two voltage levels between which the electrodes 23 are switched differs by a relatively small amount for alternate field periods so that during one field period the switching of an electrode causes the beam to be deflected in the region of that electrode to a greater, or lesser, extent than the deflection caused by the same electrode in the immediately preceding and succeeding fields so that the line scanning beam enters the multiplier, and accordingly impinges on the screen after multiplication, at a vertically spaced location from the line scanning beam deflected by the same deflector electrode in those adjacent fields. Thus the array serves to produce two sets of equally-spaced display lines in alternate fields respectively which combine to form a frame of the required number of conventional active raster lines. The difference in switching voltage levels used is chosen such that, apart from the first or last line, each line of one set falls approximately mid-way between two adjacent lines of the other set.

In order to display a TV picture according to PAL format having 575 active lines therefore, it is necessary for the deflection electrode array to have only 288 deflector electrodes. These electrodes are then used to scan vertically the beam in steps to form 288 display lines in alternate fields and 287 interlaced lines in intervening fields, successive pairs of fields thereby generating frames of 575 lines, each of which is composed of three, respectively-coloured, sub-lines. In operation of the tube, and referring again to FIG. 1, the following typical voltages may be applied with respect to a cathode potential of the electron gun 20 of 0V. The final anode of the gun is held, by means of a power supply 50, at 400V giving an electron beam acceleration voltage of 400V. Line deflection is accomplished by applying regularly potential changes of about ± 60V around a mean of 400V (with adjustment for trapezium correction) to the plates of the line deflector 17 by a line deflector output stage 51. The trough-like electrode of the reversing lens 21 is at 0V compared to the 400V potential applied to an electrode at the facing bottom edge of the partition 19 to reflect the line scanning beam 18 through 180 degrees. The apertured electrode at the input side of the multiplier 16 is at 400V. The voltage across the multiplier is typically about 1500V. The voltage of the electrode on the screen, for example, 12 kV, provides the necessary acceleration for the beam emanating from the multiplier to produce a visible output from the screen. The supply lines for these latter voltages are not shown in FIG. 1.

At the beginning of each field scan, the electrodes 23 are at 400V, producing with the input side electrode of the multiplier a field free space, and for alternate fields are subsequently switched individually in sequence by means of a switching circuit 52 to 0V in turn starting with the uppermost electrode 23 and progressing downwardly of the array so that the line scanning beam 18 is initially deflected into the uppermost channels of the multiplier 16 and then moves progressively downwardly over the multiplier in steps, the point of deflection being determined by the next electrode 23 in the array to be switched to 0V so that the line scanning beam is stepped downwardly in increments corresponding to the spacing of the electrodes 23. To this end, the switching circuit 52 is connected to outputs from the power supply 50 providing 0V and 400V and also to a timing circuit 53 supplied with TV picture timing signals.

In the other, intervening, fields the deflection electrode array 22 operates in a generally similar manner except that the electrodes 23 are switched individually in sequence from 400V to a slightly more positive voltage, for example 10V, provided by the power supply 50. Accordingly the beam deflection fields established are not so strong and in response to switching of the electrodes the line scanning beam is less sharply deflected causing it to land on the input side of the multiplier vertically displaced upwards from the respective positions achieved by the switching of the electrodes in the immediately preceding and succeeding fields. The beam is thus stepped downwardly over the input side of the multiplier in equal increments, again corresponding to the spacing of the electrodes 23, in interlaced fashion with the steps from the preceding field. The slightly higher switching voltage levels employed is chosen to position the interlaced lines substantially evenly but the effects of imperfect interlacing spatially are not too significant.

The deflection electrode array 22 and its operation will now be described in greater detail with reference to FIGS. 3, 4 and 5.

Figure 3:
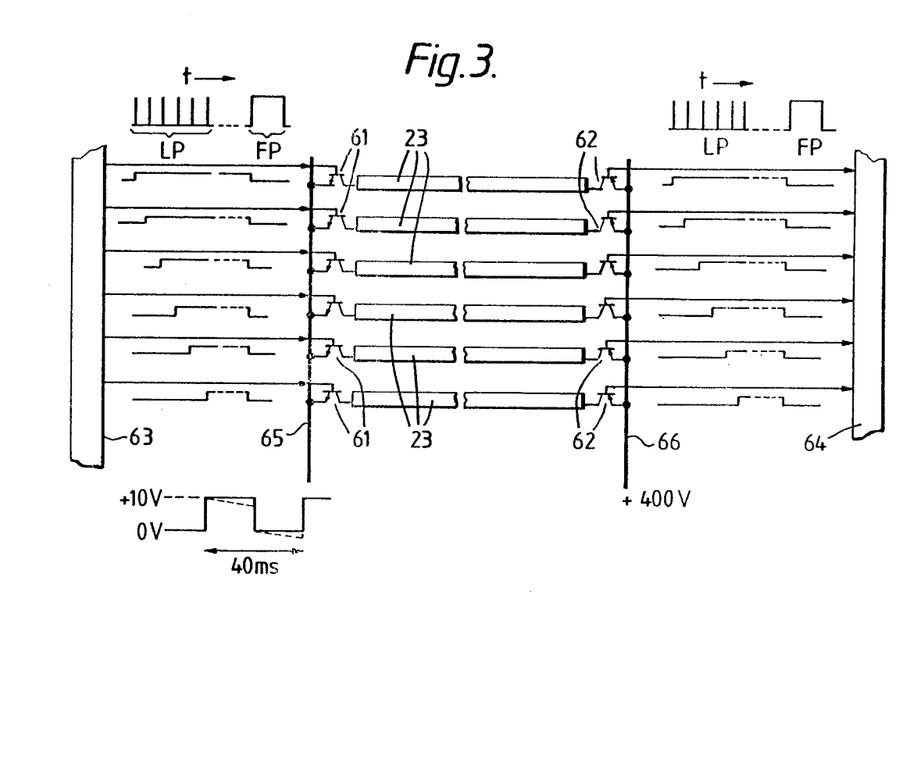
FIG. 3 shows schematically the first six electrodes of a deflection electrode array of the display tube and their associated drive circuitry for performing vertical scanning of a line-scanning electron beam within the tube.

FIG. 3 shows schematically the first six of the 288 electrodes 23, together with their associated drive circuitry. Each electrode 23 is switched using a 2-level bipolar transistor (or MOSFET) switching bridge, comprising npn and pnp transistors 61 and 62 (or N-channel and P-channel MOSFETs) connected to respective opposite ends of the electrode. The transistors 61 and 62 are controlled by voltage waveforms from drive logic circuits 63 and 64 supplied with timing signals in the form of TV line pulses, LP, and TV field pulses, FP, illustrated schematically in FIG. 3, provided by the timing circuit 53. When switched, the transistors 61 and 62 serve to connect the associated electrode 23 to either a voltage rail 65, which is switched during field blanking periods between 0V and 10V for alternate field scans as indicated by the associated 25Hz waveform, or a voltage rail 66 at 400V. The rails 65 and 66 are connected to the outputs from power supply 50. The timing and duration for the switch condition is indicated in FIG. 3 by the switching waveforms in the associated output lines from the drive logic circuits 63 and 64, whose generation will be described subsequently. In alternate field periods successive electrodes are switched from 400V to 0V by successive line drive pulses. In the other fields, successive electrodes are switched from 400V to 10V. All the electrodes 23 are reset to 400V during field blanking. The transistors 61 and 62, and drive logic circuits 63 and 64 constitute the aforementioned switching circuit 52.

The switching circuit 52, rails 65 and 66 and interconnecting lines can be readily fabricated using LSI and thin film technology in space available on the partition 19 alongside the electrodes 23. For the circuit shown in FIG. 3 energy is only dissipated when actually charging or discharging the capacitance of each electrode. In this case switching the set of 288 electrodes 23 will consume only a fraction of a watt.

In an alternative, modified, arrangement which would save half of the switches and half of the drive logic circuitry, the pnp (or p-channel) switches are replaced with high value thin-film resistors. This arrangement has the disadvantage though that it would result in continuous power dissipation in each stage from "switch-down", that is, when the electrode is switched to 0V or 10V as the case may be, until the end of the field scan. Since the resistor value must be low enough to discharge fully the electrode capacitance (typically in the order of 10 pF or less) during the 1.6 ms field blanking interval and low enough to swamp any leakage resistance, a likely value is in the region of 10 Megohms. The total switching power consumption would still be small. Power consumption could, however, be reduced by switching each electrode back to the first voltage level, 400V, within the field period a certain time after it is switched to 0V or 10V corresponding to a number of subsequent steps of the line scanning beam, the number of steps being chosen such that this switching does not perturb the beam.

It may be necessary to adjust the d.c. level of the switching pulse applied to the bases of the npn transistors 61 in alternate fields to compensate for the change in emitter potential.

Figure 4:
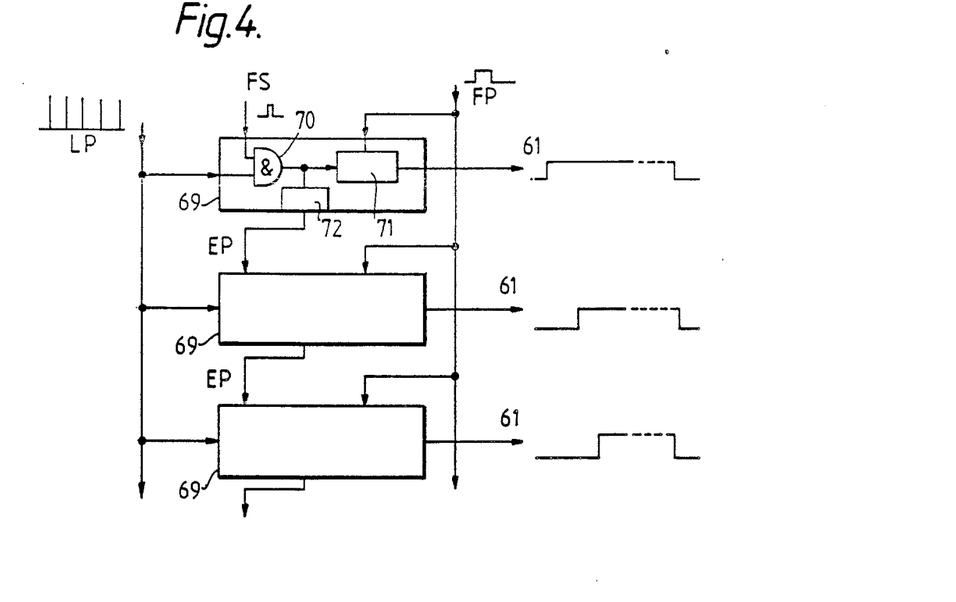
FIG. 4 shows diagrammatically a part of the deflection electrode drive circuitry associated with the first three electrodes of the array.

FIG. 4 schematically illustrates the first three stages of the drive logic circuit 63 for driving the npn (or N-channel) switches 61 on the low voltage side as shown in FIG. 3 associated with the first three electrodes 23. A similar circuit (but with inverse polarity supply voltage) is used to drive the pnp (or p-channel) switches 62 in the case where pairs of transistor switches are employed. In the example shown, each stage, 69, consists of an AND gate 70, a resettable latch circuit 71 and a pulse delay circuit 72. Considering the first stage, a train of line drive pulses LP and a field start pulse FS, also supplied by the timing circuit 53, are fed to the AND gate. The output of this gate is fed to the latch circuit 71 which turns on the associated switch 61 for the rest of field scan, with reset occurring during field retrace as a result of field pulse FP. The output of the AND gate 70 is also fed to a suitable delay circuit 72, such as a dual monostable, which provides an enable pulse EP for the next driver stage 69 associated with the succeeding electrode 23. The duration of this enable pulse is chosen so as to span the duration of the next line pulse. In this way successive deflector electrode switches 61 are turned on by successive line pulses, without the need for counters etc.

Ideally the complete drive logic system would be executed in a VLSI/thin film technology adjacent to the switches 61 and 62 and deflector electrodes 23 with direct connection via deposited conductors. Alternatively, with a change of output conductor pattern the drive logic system could take the form of a number of LSI modules. In either case it will be seen that the inputs to the drive logic are few in number, namely three pulse inputs together with the logic supply voltage(s) (which, although not shown in FIGS. 1 and 4 for simplicity, may be obtained from the power supply 50). In fact by using an extra IC pulse separator module it would be possible to reduce the pulse signal input to a single composite pulse waveform. This may be advantageous where it is necessary to couple in the pulses via an opto-coupler to accommodate large voltage level shifts (as might be the case for the pnp/p-channel switch drivers).

Figure 5A:
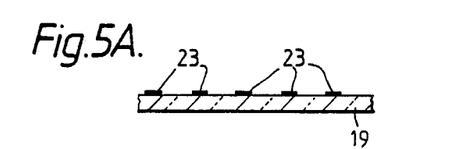
FIGS. 5A and 5B illustrate respectively in cross-sections different constructional forms of the deflector electrode array.
Figure 5B:
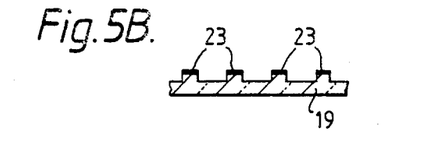

FIGS. 5A and 5B are diagrammatic cross-sections through a portion of the deflector electrode array-carrying partition 19 and show two ways in which the electrode array may be formed. Taking for example a tube having a display area of around 240 mm by 180 mm with 575 active lines in a complete frame the electrode pitch required will be approximately 0.6 mm. Bearing in mind the need for 400V, or more, isolation between adjacent electrodes 23 a typical arrangement would use electrodes 0.1 mm wide and separated by 0.5 mm. These could be deposited on the flat surface of the glass partition 19, as shown in FIG. 5A, using any suitable known technique. Alternatively, to improve further voltage isolation and obviate charging effects, it might be considered preferable to use a photoetchable glass for the partition 19 and to etch this glass to produce, in cross-section, a castellated surface profile, as shown in FIG. 5B. The electrodes 23 are then deposited on the plateaux of this surface, for example by evaporation of nickel at an oblique angle, with the intervening troughs in the surface of the glass providing adequate isolation.

The ability to change the landing point of the electron beam on the multiplier by changing the "low" voltage to which the deflector electrodes are switched offers a further potential advantage. Ideally, the electrons should emerge from the reversing lens 21 parallel to the multiplier plane and continue thus in the free space region until they reach the voltage transition which deflects them onto the multiplier. However, in practice it is difficult to ensure that this happens precisely and there is likely to be a progressive displacement of the beam towards or away from the multiplier, which may have an adverse effect on the picture geometry. With the new arrangement proposed, it is in principle possible to vary the "low" switching potential progressively during field scan to compensate for this error. The 25 Hz square wave applied to the "low" voltage rail 65 in FIG. 3 would then, for example, be modified as shown exaggerated by the dotted lines in the associated waveform illustrated.

The above described deflector electrode array arrangements and their drive systems offer a means of achieving very uniform stepped vertical scan for the colour tube, which requires only pulse drive waveforms and three or four d.c. voltages, one of which changes between two levels at field rate, to the tube.

Whilst in the embodiment described above the line scanning beam is produced in a rear region of the tube and directed into a front region by a reversing lens where it is field scanned over the screen, it will be appreciated that different tube configurations may be used where the line scanned electron beam producing means is situated to one end of the space between the deflection electrode array and the screen.

Figure 6:
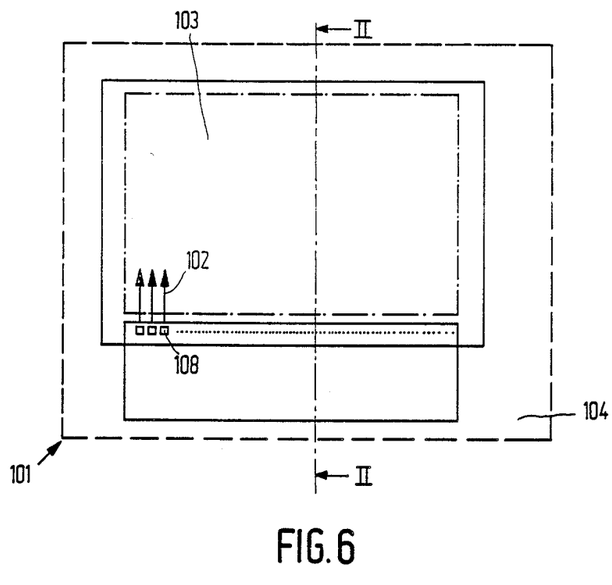
FIGS. 6 and 7 show another embodiment of a cathode ray tube display system according to the invention.
Figure 7:
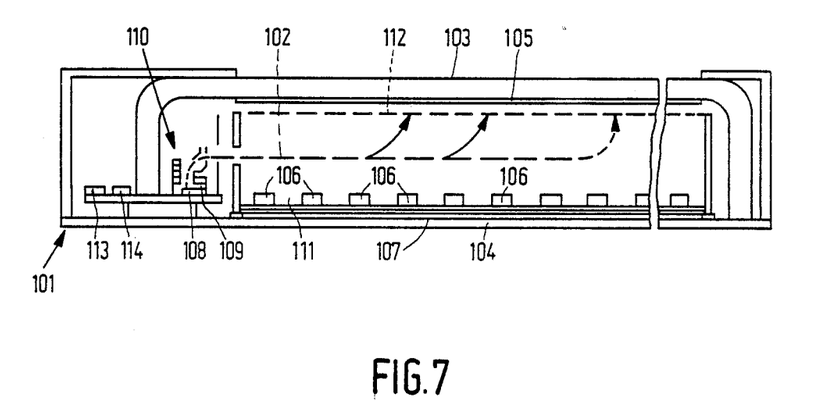

In FIGS. 6 and 7 another embodiment of a cathode ray tube display system is shown in which a plurality of substantially parallel electron beams rather than a single line-scanning beam are field scanned over the phosphor screen. The display device 101 has means for generating a plurality of electron beams 102 which move at least substantially in a plane parallel to a front wall 103 and a rear wall 104 before they are deflected in the direction of a phosphor screen 105. The electron beams move not only parallel to the front wall 103 and the rear wall 104 but also substantially perpendicular to the picture lines of the picture to be displayed; this is notably the case if at least one electron beam is available for each pixel column. The phosphor parts to be impinged upon (in other words the picture line to be activated) are (is) selected via voltages at a field deflection electrode array similar to that of the previous embodiment. The array comprises deflector electrodes 106, only a few of which are shown, arranged in this embodiment on an insulative support 107. The electron beams 102 are deflected thereby towards the phosphor screen 105.

In this embodiment the electron beams 102 are generated by means of semiconductor cathodes 108 which may be separately driven, having emissive surfaces 109 extending parallel to the walls 103, 104. The generated electron beams 102 are deflected through an angle of 90 degrees within a distance of less than 1 to 2 cm by means of an electron-optical system 110. The structure and method of manufacture of a suitable electron-optical system is described in greater detail on EP-A 0 284 119.

The deflected electron beams 102 are subsequently accelerated to an energy of approximately 2.5 KeV in a direction parallel to the walls 103, 104 into region 111. Possible positive ions which are generated will also move parallel to these walls, be it in an opposite direction and cannot impinge upon the emissive surfaces due to the large mass difference with respect to the electrons.

After the electrons have been accelerated as far as the region 111, they are deflected towards the phosphor screen 105, through a shadow mask 112.

In the device shown the phosphor screen 5 is divided, for example, into horizontal strips of three differently-coloured (R, G, and B) luminescent materials. Each aperture in the shadow mask is common to three different colour elements. The information for each of the three colours is presented during $\frac{1}{3}$ of the line period whereafter the voltages at the deflection electrodes are slightly changed and the information for the adjacent colour track is presented during $\frac{1}{3}$ of the line period etc. Since in TV-display the (colour) information is simultaneously read and is presented in accordance with the incoming signal, the colour information is stored temporarily in line memories. Each colour to be displayed requires two line memories, namely one for the line which is read and a second in which the next line is stored. Deflection is accomplished by the deflection electrode array comprising the plurality of deflector electrodes 106, whose construction, operation and associated drive circuit follow that of the previously described embodiment except that in this embodiment the individual electrodes 106 are straight rather than bowed.

For each pixel to be displayed the display device comprises at least one cathode 108 which is provided with the correct voltages for obtaining the desired electron emission by means of a control unit 114 which is diagrammatically shown and which in turn is controlled by a circuit 113.

The assembly of cathodes and other components may be secured to the rear wall 104 with the different parts being interconnected via metal tracks, whilst the rear wall 104 is made of, for example, glass.

I claim:

1. A flat cathode ray tube apparatus comprising a cathode ray tube having an envelope, a luminescent screen extending over a substantially flat faceplate, means in the envelope for producing and directing an electron beam substantially parallel to the faceplate, and a deflection electrode array within the envelope and operable by a drive circuit for deflecting the beam in a direction towards said faceplate in field scanning manner, characterised in that the deflection electrode array comprises a plurality of deflector electrodes which are switched successively between two selected voltage levels in each field period to produce deflection fields with at least one of the selected voltage levels being different in alternate fields whereby in one field period one set of display lines is produced on the screen and in the successive field period a second set of display lines interlaced with the first set is produced.

2. A flat cathode ray tube apparatus according to claim 1, characterised in that the electrodes of the deflection electrode array are spaced so as to form substantially equally spaced display lines on the screen and in that the switching voltages are selected such that display lines of one of the two sets of interlaced lines obtained are positioned substantially midway between adjacent pairs of display lines of the other set.

3. A flat cathode ray tube display apparatus according to claim 1 or claim 2, characterised in that the electron beam comprises a low energy beam of less than 2.5 KeV and in that the tube further includes a channel electron multiplier disposed parallel to, and spaced from, the faceplate over whose input side the electron beam is scanned by the deflection electrode array to provide electron input thereto.

4. A flat cathode ray tube display apparatus according to claim 3, characterised in that the luminescent screen comprises a repeating pattern of three phosphor elements adapted to luminesce in different colours respectively, in that the tube further includes a colour selection electrode arrangement between the output side of the electron multiplier and the screen which is operable to deflect selectively the electron beam exiting from the channels of the multiplier towards each of the three phosphor elements, and in that the deflection electrode array is driven to deflect the beam in the field direction in steps at regular intervals corresponding to standard line scan intervals and the colour selection means is operated so as to draw three separate and differently coloured sub-lines on the screen between each step of the line scanning beam.

5. A flat cathode ray tube display apparatus according to claim 1 or 2, characterised in that the electron beam comprises a line scanning electron beam.

6. A cathode ray tube display apparatus according to claim 5, characterised in that the means for producing and directing the beam comprises an electron gun and a line deflector in a rear region of the tube which directs the line scanning beam in that region substantially parallel to the faceplate, and a reversing lens towards one end of the tube which directs the line scanning beam into a front region of the tube over the deflection electrode array.

7. A flat cathode ray tube display apparatus according to claim 1, characterised in that the drive circuit for driving the electrodes of the deflection electrode array is operable to switch the electrodes of the array in succession during alternate field periods from a first predetermined voltage to a second predetermined voltage and in intervening field periods between the first predetermined voltage and a third predetermined voltage different to the second predetermined voltage at standard line scan intervals.

8. A cathode ray tube display apparatus according to claim 7, characterised in that, at the beginning of each field, the electrodes of the deflection electrode array are all at the first predetermined voltage and are individually switched in turn to the second or third predetermined voltage as appropriate to that field so as to step the beam progressively in the field direction.

9. A cathode ray tube display apparatus according to claim 7 or claim 8, characterised in that the drive circuit for the deflection electrode array comprises for each deflector electrode of the array a transistor switching bridge circuit, the plurality of bridge circuits being connected to their respective electrodes and to a common first source at the first predetermined voltage, and a common second source switched alternatively between the second and third predetermined voltage during consecutive field blanking periods, and a control circuit for operating the transistor switching bridge circuits one after the other according to standard line scan intervals.

10. A flat cathode ray tube display according to claim 1, characterised in that the drive circuit for the deflection electrode array is contained within the tube's envelope.

11. A flat cathode ray tube display apparatus according to claim 10, characterised in that the deflection electrode array is provided on a substrate within the envelope and in that the deflection electrode array drive circuit is carried on said substrate adjacent to the electrodes of the array and connected thereto by tracks on the substrate.

12. A flat cathode ray tube display apparatus according to claim 11, characterised in that the substrate comprises insulative material and in that the drive circuit is formed on the substrate using an LSI fabrication process.

13. A cathode ray tube display apparatus according to claim 10 or claim 12, characterised in that the electrodes of the deflection electrode array and said tracks comprise conductive material deposited on the substrate.

14. A cathode ray tube display apparatus according to claim 13, characterised in that the surface of the substrate comprises a series of troughs and plateaux and in that the electrodes of the array are deposited on respective plateaux.

* * * * *